June 9, 1959   W. D. ABRAHAMS   2,889,684
PREFABRICATED IRRIGATION GATE
Filed Aug. 4, 1955
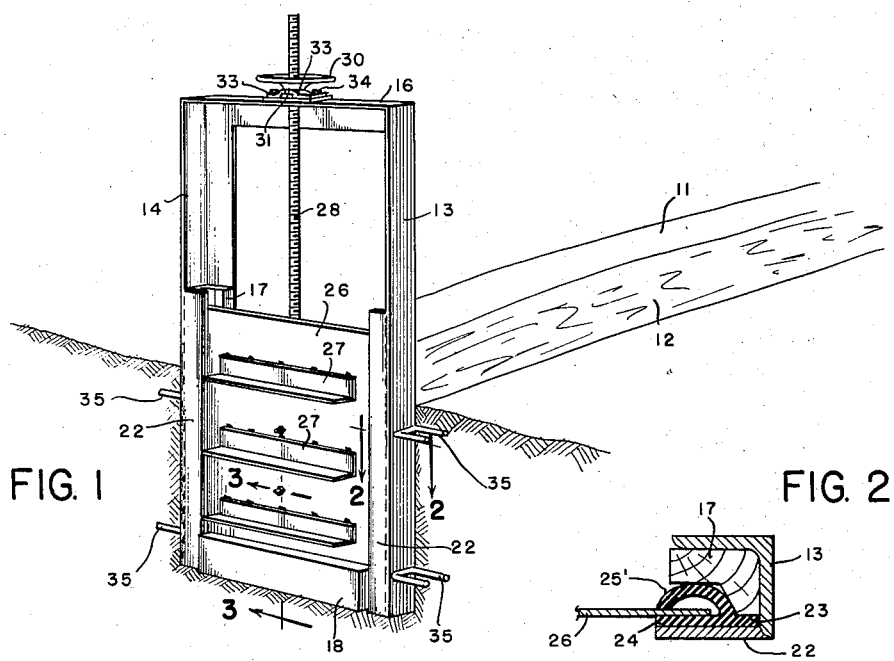
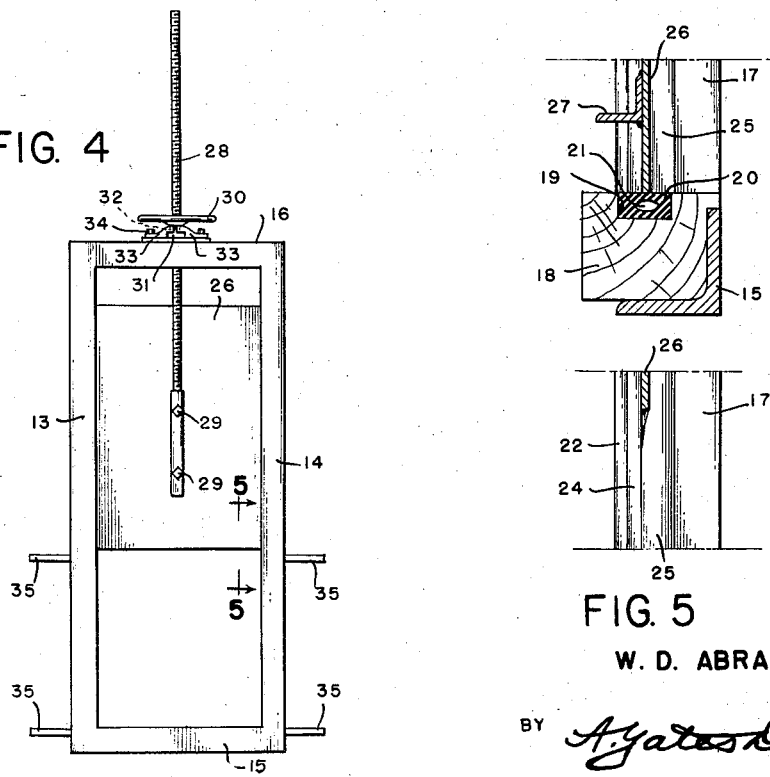
INVENTOR
W. D. ABRAHAMS
BY A. Yates Dowell
ATTORNEY

United States Patent Office 2,889,684
Patented June 9, 1959

2,889,684

PREFABRICATED IRRIGATION GATE

William D. Abrahams, Tempe, Ariz.

Application August 4, 1955, Serial No. 526,501

3 Claims. (Cl. 61—28)

This invention relates to the control of water in channels and more particularly to the flow of water in irrigated farming.

This invention specifically relates to adjustable gates for controlling the amount of water flowing through irrigation ditches or canals in order that no unnecessary waste of water will take place and that the correct amount of water will flow to its intended place in the irrigation system.

Heretofore, gates constructed for use in controlling the flow of water in irrigation systems have generally been mounted in ordinary groove slideways with a loose fit between the gate and the slideway. This loose fit allows a large amount of leakage of water even when the gate is closed with resulting waste. Furthermore, the conventional groove slideways would fill up with sand, rocks and other debris particularly when the gate is in its raised position, consequently preventing free sliding of gate to its lowered or closed position with some rocks in the bottom groove actually preventing complete closure of the gate.

An object of this invention is to provide a water gate for an irrigation system which satisfactorily overcomes the objections set forth above and is economical to manufacture and to use.

A further object of this invention is to provide a water gate which can be readily fabricated at a central plant, and can be installed by relatively unskilled persons.

A still further object of this invention is to provide a simple and trouble-free water gate that effectively seals against water leakage while permitting free movement during use.

A further object is to provide a seal for preventing the passage of fluid between a panel and a groove receiving the panel.

Other objects and advantages of the invention will be apparent from the following description taken in conjunction with the accompanying drawing wherein:

Fig. 1 is a sectional perspective view from the outlet side of a water gate installed in an irrigation channel with portions of the channel cut away to show the installation;

Fig. 2, a fragmentary sectional view taken on line 2—2 of Fig. 1 showing the slideway and seal for the movable panel of the gate;

Fig. 3, a sectional view taken on line 3—3 of Fig. 1 showing the bottom of the panel and the gasket for sealing the same;

Fig. 4, a rear elevational view of the water gate in raised or open position; and Fig. 5, a fragmentary section taken on line 5—5 of Fig. 4 showing the U-shaped gasket closing the slide receiving groove following the raising of the gate plate.

Briefly, the present invention of an irrigation head gate comprises an upstanding rectangular frame having inwardly extending guide channels on the sides thereof with a U-shaped sealing gasket fixed in such guiding channels and a sealing gasket at the bottom of the frame, a slidable plate is mounted in the groove of the U-shaped gasket and is moved upwardly and downwardly by means of a hand wheel engaging a threaded rod projecting upwardly from the plate for opening and closing the gate, the gaskets serving to seal the edges of the plate against leakage of liquid therepast. The frame is provided with outwardly extending U-shaped anchoring elements adapted to be fixed in the concrete, forming the water channel in which the head gate is used.

Referring more particularly to the drawing, a conventional irrigation channel 11 formed of concrete or the like in which water 12 is flowing has a head gate mounted in the path of flow of the water to control such flow. The head gate comprises a pair of upstanding angle members 13 and 14, a bottom cross angle member 15 and a top cross angle member 16, each angle member having one flange extending forwardly in the direction of flow of the water and the other flange of each angle member extending inwardly. A strip of decay resistant redwood 17 of V-shaped section is mounted in each of the upstanding angle members with each leg of the redwood strip abutting the corresponding flange of its upright. A strip of decay resistant wood 18 of rectangular cross section is mounted in the bottom angle member 15, said rectangular strip of wood 18 being provided with a groove 19 therein. A tubular gasket 20 having an external shape corresponding to the groove 19 and having a hollow passage 21 extending longitudinally therethrough is secured by any suitable means within the groove 19.

An inwardly extending strap 22 of suitable material such as strap iron is secured to each of the upstanding angle members 13 and 14 with one edge welded or otherwise secured to the forwardly projecting flange of the associated upright as clearly shown in Fig. 2. A slideway channel or gasket-receiving recess is formed between the concave portion of each V-shaped strip of redwood 17 and the adjacent covering strap 22 and a sealing gasket of U-shape in cross section having a web 23, a flat leg or flange 24 and a curved leg or arched flange 25 is fixed in the gasket-receiving recess by any suitable means which holds an extension or web 23 of the flat leg 24 to the strap 22 thereby securely retaining the U-shaped gasket in position, the V-shaped strip of wood 17 being fixed to the upright member by any suitable means such as screws, adhesive, or other suitable means.

A closure plate or panel 26 of a size to completely close the irrigation channel 11 is slidably mounted at its opposite side edges between the legs 24 and 25 of each sealing gasket. The bottom edge of the plate 26 abuts the tubular gasket 20 in the bottom strip 18 to completely seal the irrigation channel against passage of water therethrough. The slidable plate 26 is reinforced to prevent buckling by suitable angle bars 27 or the like mounted on the forward or down stream surface thereof and secured thereto by welding or other suitable means.

An upstanding elongated rod 28 having its lower end secured to the plate 26 by bolts 29 and having its upper end extending through an aperture in the forwardly extending flange of the cross member 16 is threaded throughout a major portion of its length. A hand wheel 30 having an internally threaded hub 31 is threaded onto the rod 29 for raising and lowering the plate 26. The hub 31 of the hand wheel has an annular groove 32 which receives forked portions of opposed yoke members 33, 33 which yoke members are secured to the cross member 16 by suitable bolts 34, 34 to prevent axial movement of the hand wheel in use so that the plate 26 may be positively closed as well as opened by movement of the hand wheel in the appropriate direction.

In installing the prefabricated head gate of the present invention, suitable U-shaped anchoring projections 35 are secured to the forwardly extending flanges of the uprights 13 and 14 for extending into the material such as concrete or the like from which the channel 11 is formed, thereby securely anchoring the framework of the head gate in fixed position, the U-shaped members being secured to the frame by any suitable means such as welding or the like. The anchoring projections 35 may be secured to the frame by welding at the time of fabrication or such anchoring projections may be secured to the frame at the point of installation so that one size of head gate may be used for varying depths of channels and suitable consideration can be given to the strength of the material forming the channel.

It will thus be seen that applicant has provided an efficient head gate which completely seals the channel in which it is used against passage of liquid past the gate, the U-shaped sealing gaskets of rubber or other suitable material maintaining a tight seal against the surfaces of the gate. The convex leg 25 of the U-shaped sealing gasket being of a type to readily move into contact with the fixed leg 24 (Fig. 5) when the plate 26 is moved upwardly so as to prevent silt, rocks or the like from getting into the groove of the U-shaped gasket rendering the gate operative at all times, any debris or silt collecting on the tubular gasket 20 being readily eroded away by the movement of the water 12 and in the event that some material should remain on the upper surface of the gasket 20, the lower edge of the plate 26 will compress such material into the resilient gasket 20 and still provide a suitable seal.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A head gate comprising a frame, a pair of upstanding angle members and a cross member at the top and the bottom of said upstanding angle members and secured together providing a frame, each angle member having one flange extending forwardly and the other flange extending inwardly, a strip of decay resistant wood of V-shape section in each of the upstanding angle members with each leg of the V-shaped strip of wood abutting the corresponding flange of its upstanding angle member, a strip of decay resistant wood of rectangular cross section in the bottom angle member, said rectangular strip of wood having a gasket receiving groove in the upper surface thereof, a tubular gasket in said groove, an inwardly extending strap on each of the upstanding angle members secured with one of its edges to the forward edge of the forwardly extending flange of its cooperating upstanding angle member and forming a gasket receiving recess with the associated V-shaped strip of wood, a sealing gasket of U-shaped section in the recess formed between the concave side of said V-shaped piece of wood and said strap, the leg of said U-shaped gasket adjacent said strap having an extension beyond the bight portion thereof with the extension of said gasket securely fixed by the forwardly extending leg of the V-shaped strip of wood and the strap, a plate positioned within said frame and slidably mounted at its opposite side edges between the legs of the adjacent U-shaped gasket and adapted to have its bottom edge abut the tubular gasket in the bottom strip of wood to completely close the lower portion of the frame, and means reacting between said frame and said plate to move said plate relative to said frame to open and close said gate.

2. A head gate comprising a frame, a pair of upstanding channel members and a cross member at the bottom of said upstanding members, said members being secured together providing a frame, a strip of decay resistant wood of V-shape section in each of the upstanding channel members with one leg of each V-shaped section abutting one flange of its upright and the other leg of the V-shaped section abutting the web of the channel, a strip of decay resistant wood in the bottom cross member, said strip of decay resistant wood in the bottom member having a gasket receiving groove in the upper surface thereof, a tubular gasket in said groove, the other flange of each channel member forming a gasket receiving recess with the other leg of its associated V-shaped strip of wood, a resilient and yieldable sealing gasket of U-shaped section in the recess formed between the concave side of said V-shaped piece of wood and said other flange of its associated channel member, the leg of said U-shaped gasket adjacent said other flange having an extension beyond the bight portion thereof with the extension of said gasket securely fixed by the said other leg of the V-shaped strip of wood and the said other flange of its associated channel member, a plate positioned within said frame and slidably mounted at its opposite side edges between the legs of the adjacent U-shaped gasket and adapted to have its bottom edge abut the tubular gasket in the bottom strip of wood to completely close the lower portion of the frame, and reinforcing bars on the said plate to prevent buckling thereof.

3. A water gate comprising a frame having inwardly facing slide forming channels, a panel having its edges slideable in said channels, a resilient and flexible gasket positioned in each of said channels and each gasket embracing its associated side edge of the panel, said gasket having a portion of U-shaped cross-section with one of the legs of the U-shaped gasket being arch-shaped in cross-section, said arch-shaped leg being adapted to extend toward the upstream side of the water gate, the other leg of the U-shaped gasket being in contact with the flange on the downstream side of the channel throughout substantially the entire length of the gasket, means to retain the gaskets in the channels, the arch-shaped leg of the gasket being in contact with the upstream side of the panel whereby the panel will be urged against the other leg of the gasket and the arch-shaped portion will exclude foreign matter and prevent leakage around the edge of the panel.

References Cited in the file of this patent

UNITED STATES PATENTS

| 1,062,635 | Clements | May 27, 1913 |
| 1,370,894 | Lee | Mar. 8, 1921 |
| 1,889,439 | Greenwald | Nov. 29, 1932 |
| 2,055,512 | Wallace | Sept. 29, 1936 |
| 2,485,755 | Loosli | Oct. 25, 1949 |
| 2,611,937 | Kendrick | Sept. 30, 1952 |
| 2,637,171 | Black | May 5, 1953 |
| 2,697,913 | Bonander et al. | Dec. 28, 1954 |

FOREIGN PATENTS

| 336,399 | Germany | Apr. 30, 1921 |